July 18, 1967 P. JARVIS 3,331,535

DISPENSER FOR PASTE-LIKE MATERIALS

Filed Dec. 20, 1965 4 Sheets-Sheet 1

PETER JARVIS,
Inventor

By Wenderoth,
Lind and Ponack Attorneys

July 18, 1967 P. JARVIS 3,331,535
DISPENSER FOR PASTE-LIKE MATERIALS
Filed Dec. 20, 1965 4 Sheets-Sheet 2

PETER JARVIS
Inventor

By Wenderoth,
Lind and Ponack  Attorneys

July 18, 1967  P. JARVIS  3,331,535
DISPENSER FOR PASTE-LIKE MATERIALS
Filed Dec. 20, 1965  4 Sheets-Sheet 3

PETER JARVIS
Inventor

By Wenderoth,
Lind and Ponack  Attorneys

July 18, 1967 P. JARVIS 3,331,535
DISPENSER FOR PASTE-LIKE MATERIALS
Filed Dec. 20, 1965 4 Sheets-Sheet 4
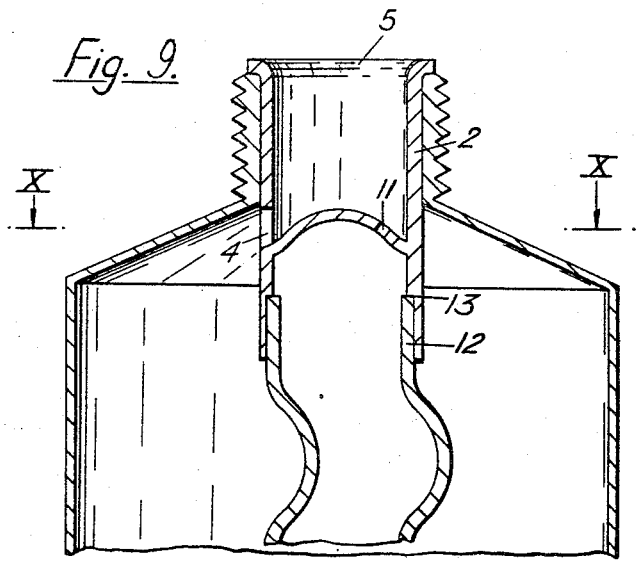
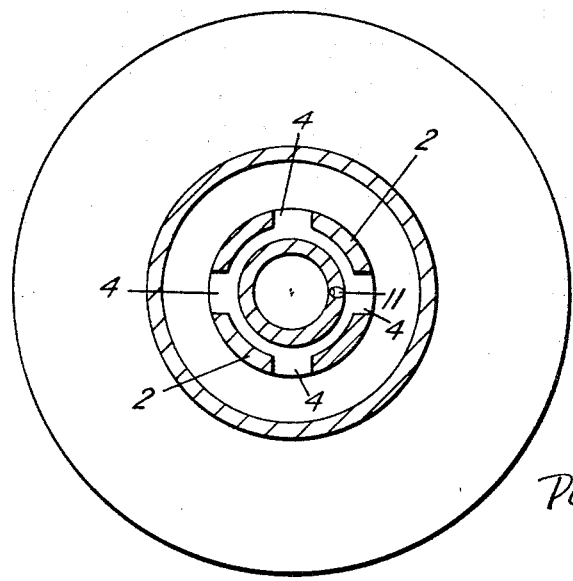
PETER JARVIS
Inventor

United States Patent Office 3,331,535
Patented July 18, 1967

3,331,535
DISPENSER FOR PASTE-LIKE MATERIALS
Peter Jarvis, Morpeth, England, assignor to Sterling Drug Inc., New York, N.Y., a corporation of Delaware
Filed Dec. 20, 1965, Ser. No. 515,090
Claims priority, application Great Britain, Dec. 24, 1964, 52,499/64
1 Claim. (Cl. 222—94)

This invention relates to a dispenser for paste-like materials and provides a dispenser which is capable of extruding two or more paste-like materials as a composite stream, one at least of said materials being extruded into the interior of the composite stream.

According to the present invention there is provided a dispenser for simultaneously extruding two or more paste-like materials to form a composite stream, which comprises a container having a discharge passage which communicates with the interior of the container and a reservoir disposed within the container, said reservoir being in communication with the interior of the container and having one or more discharge orifices directed towards the discharge passage so that when paste-like material is extruded through the discharge passage from the interior of the container, one or more streams of paste-like material are simultaneously discharged from the reservoir into the interior of the main stream of material extruded through the discharge passage. Normally the discharge orifice or orifices of the reservoir are so formed that the contents of the reservoir are discharged in a direction parallel to the axis of the discharge passage but this is not essential and it is only necessary that the contents of the reservoir are discharged into the interior of the main stream of material extruded from the dispenser. The discharge orifice or orifices may be disposed centrally of the discharge passage but it is not essential that the orifice or orifices should discharge into the centre of the discharge passage.

It should be understood that the term "paste-like" is used herein to mean materials having a consistency such that they can be contained in and dispensed from a conventional collapsible tube and includes materials having a pasty, plastic, creamy or gelatinous consistency which may be opaque, translucent or transparent in appearance.

One specialised application for the dispenser of the present invention is in packaging fluoride-containing toothpastes for which, in conventional practice, it is customary to use special waxed lead collapsible tubes because of the difficulty in protecting the aluminum of the conventional collapsible tubes from attack by the fluoride. In packaging such a toothpaste into a dispenser in accordance with the invention, the fluoride component of the toothpaste may be filled into the reservoir, which is conveniently made of plastic material and would normally be inert to the fluoride, while the remainder of the paste is filled into the main body of the container which may be a conventional aluminum collapsible tube since the fluoride does not come into contact with the walls of the container.

The dispenser of the present invention is usefully employed in the packaging of pharmaceutical and cosmetic formulations which are of such a nature that they are adapted to be packaged in collapsible tubes. Difficulties are sometimes experienced in the preparation of pharmaceutical formulations for topical application because of incompatibility between ingredients which it is desired to include in the formulation, with the result that it is either not practicable to include certain ingredients in the same composition or the compositions have a very short shelf life because of interaction between the incompatible ingredients during storage. By means of the dispenser of this invention, it is possible to include incompatible materials in the same package since the mutually incompatible ingredients may be separated inside the dispenser by filling one ingredient into the reservoir and the other ingredient into the body of the container so that the incompatible ingredients are only brought together on ejection from the dispenser.

Where the material filled into the body of the container is transparent or translucent and the material in the reservoir differs in colour or differs in appearance in some other way, a pleasing and novel effect can be obtained when the materials are extruded from the dispenser. If the discharge orifice of the reservoir is circular in shape, the material ejected from the dispenser is seen as a main stream of transparent of translucent material having a rod-shaped stream of different character in its interior. It will be appreciated that by varying the shape of the discharge orifice of the reservoir and also the colour of the material contained in the reservoir, a variety of pleasing effects can be obtained, including for example a ribbon shaped stream of contrasting colour contained in a main stream of transparent or translucent material.

The reservoir and discharge passage are conveniently formed integrally together as a tubular insert projecting into the container, the inner portion of the insert constituting the reservoir and being separated from the remainder of the insert by a wall in which is formed the discharge orifice or orifices, while the remainder of the insert constitutes the discharge passage and is in communication with the interior of the container by means of one or more openings formed in the side walls of the tubular insert. The tubular insert is normally sized so as to fit tightly in the neck of the container, which is normally a conventional collapsible tube, and the reservoir is either filled with material prior to fitting the insert into the neck of the container or alternatively, after the insert has been fitted in the neck of the container but before the main body of the container is filled. After filling the reservoir, the main body of the container is filled with paste-like material and, where the container is a collapsible tube, the open end of the container opposite the neck is bent over and crimped in the normal way.

In an alternative construction, the discharge passage may be formed by a tubular insert closed at the bottom and open at the top and having one or more openings in the side wall for communication with the interior of the container when the insert is fitted into the neck of the container with the closed end inwards. A length of tube, e.g. a flexible plastic tube, such as polythene, is fitted over the closed end of the insert and forms the reservoir and one or more holes are provided in the closed end of the insert to form the discharge orifices for the reservoir.

It may be necessary to restrict the degree of contact between the contents of the reservoir and those of the container in order to prevent diffusion of the materials across the interface, for example, bleeding of colouring matter between the contents of the reservoir and those of the container. This may be achieved by restricting contact between the reservoir and the container to one or more comparatively small openings in the reservoir but it must, of course, be borne in mind that the smaller the area of contact between the contents of the reservoir and those of the container, the lower will be the proportion of material originating from the reservoir in the composite stream extruded from the dispenser.

The invention will now be described with reference to the accompanying drawings in which:

FIGURE 9 is a sectional view of a further modification of FIGURE 1 and FIGURE 10 is a sectional view taken along the line X—X of FIGURE 9.

Figure 1:
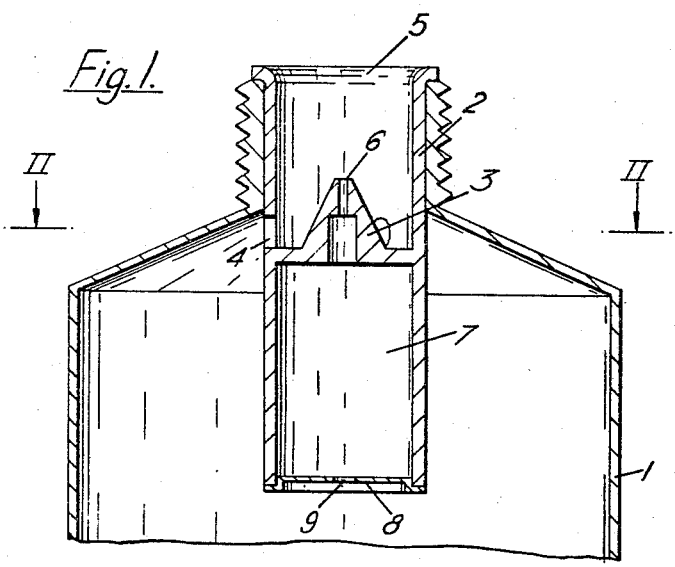
FIGURE 1 is a sectional view of the dispenser in the form of a collapsible container.
Figure 2:
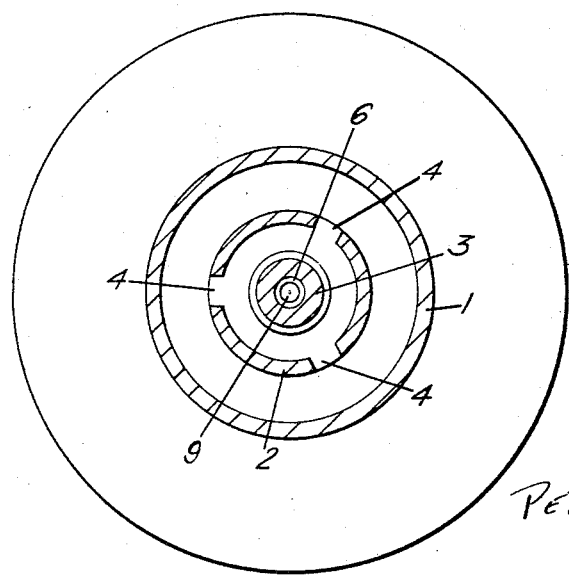
FIGURE 2 is a sectional view taken along the line II—II of FIGURE 1.

Referring to FIGURE 1 of the drawings, the dispenser comprises a collapsible container 1 having a threaded neck for reception of a screw-cap and being provided with a tubular insert 2 force-fitted into the neck. The tubular insert 2 has a domed wall 3 separating off the lower part of the insert and is provided with three ports 4 symmetrically disposed around the tubular insert and positioned just above wall 3. It will be appreciated that the ports 4 are provided to allow the material in the main body of the container to be passed out of the dispenser through a discharge passage 5 formed by the upper portion of the tubular insert. A single central discharge orifice 6 is formed in the domed wall 3 in order to allow the discharge of material from a reservoir 7 formed by the lower part of the insert 2. A cap 8 is fitted over the lower end of resevoir 7 in order to prevent diffusion of colour and material into the main body of the container and a hole 9 is provided in the cap 8 so that the contents of the reservoir will be displaced by material from the main body of the container when material is squeezed out of the main body of the container in the normal use of the dispenser. It will be appreciated that the relative sizes of the discharge orifice 6 and the ports 4 will require to be determined by experiment for particular relative capacities of the reservoir 7 and container 1 in order to ensure that the reservoir and the main body of the container are emptied at substantially the same time.

As mentioned above, the dispenser may be charged by first filling the reservoir with suitable material, inserting the filled reservoir into the neck of a collapsible container and then filling the container from the opposite end in conventional fashion followed by bending over the end of the container and crimping to close it.

The construction of the reservoir may be modified if desired to provide separate compartments for two or more materials, for example, by constructing one or more longitudinal divisions in the reservoir, each compartment so formed being provided, of course, with a discharge orifice so that the material in each compartment can be discharged into the discharge passage. It is however possible to fill two or more pastes into the reservoir without modifying its construction and this may be achieved by filling the paste into the reservoir in horizontally layered formation with, if necessary, an inert material placed between the different layers.

Figure 3:
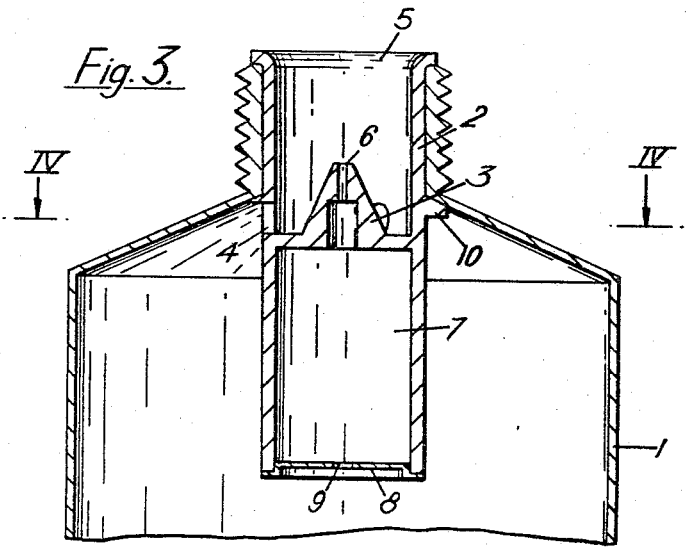
FIGURE 3 is a sectional view of a modification of FIGURE 1.
Figure 4:
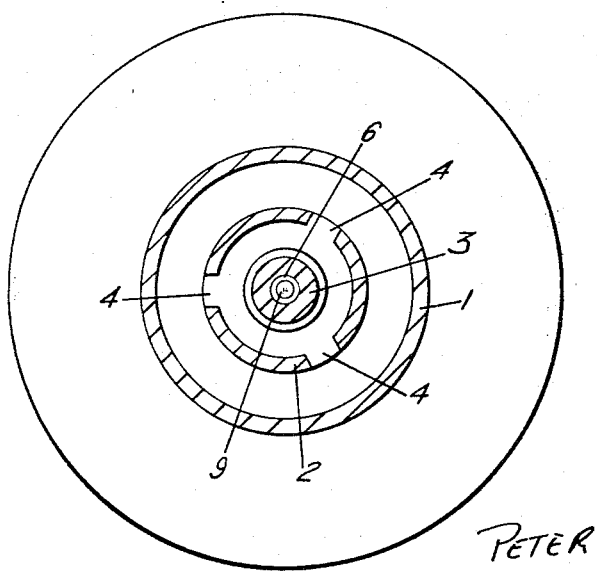
FIGURES 4 to 8 are views similar to FIGURE 2 of some modifications of the embodiments of FIGURE 1 or 2.
Figure 5:
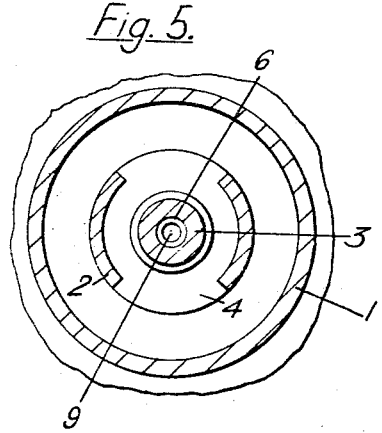
Figure 6:
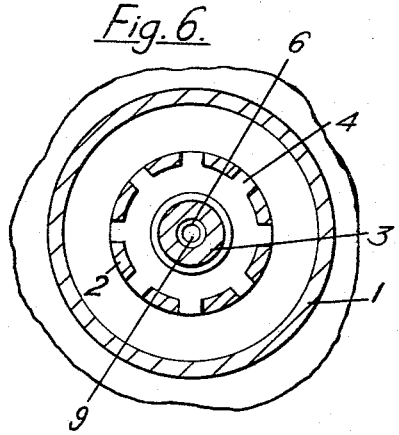
Figure 7:
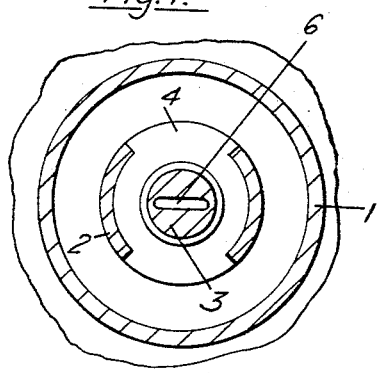
Figure 8:
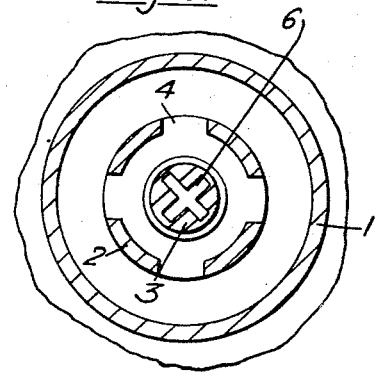

Referring to FIGURES 3 and 4 of the drawings, there is shown a modification of the arrangement illustrated in FIGURE 1, the modification being that, whereas in FIGURE 1 the tubular insert is put into position by being inserted through the neck of the collapsible container, in the embodiment of FIGURES 3 and 4 this insert is put into position through the interior of the container, the insert having a flange 10 formed around its periphery as a means of locating it in its correct position in relation to the open end of the neck of the container.

The cross-sectional views shown in FIGURES 5 to 8 inclusive show modifications of the particular structure of the tubular insert illustrating different arrangements of the ports 4 and different shapes of the discharge orifice 6.

In the further embodiment illustrated in FIGURE 9 the differences from the embodiments illustrated in FIGURES 1 and 3 are small and one difference is that the discharge orifice is differently positioned in the embodiment of FIGURE 9 and, as will be seen, it is disposed to one side of the domed wall 3 of the insert. Thus, the discharge orifice is shown at 11 and can be seen to be set to one side thus producing a different effect from that obtainable with the central discharge orifice 6 and, if desired, more than one discharge orifice 11 may be provided around the central axis of the tubular insert so as to give a plurality of streams of material carried along in the main body of the paste being expressed from the container.

A second variation to be seen in FIGURE 9 is that the tubular insert is slightly modified to have a portion having a greater diameter 13 towards its lowermost end, this enlarged diameter 13 being adapted to receive a flexible tube 12 in which there is accommodated the material to be expressed into the main stream of material. The cross-sectional view of this embodiment appears in FIGURE 10 which shows only a single orifice 11 although, as indicated above, a plurality of such orifices 11 may be disposed around the domed wall 3.

The use of the same reference numerals in different figures of the drawings is to indicate like parts in the several constructions illustrated.

While the dispenser of the present invention has been described with particular reference to its construction in the form of a collapsible container, it will be appreciated that a rigid container may be employed having, for example, a piston arrangement for discharging its contents.

I claim:

A dispenser for simultaneously extruding two or more paste-like materials to form a composite stream, which comprises a container having a discharge passage which communicates with the interior of the container, a reservoir disposed within the container and positioned therein to leave a space between the reservoir and the wall of the container, said reservoir having one or more orifices in the free end portion thereof within the container placing the reservoir in communication with the interior of the container, said orifices being sufficiently small to prevent substantial diffusion of material between the reservoir and the container and yet permitting transmission of the pressure of the material within the container to the contents of the reservoir, a hollow insert secured within the discharge passage and extending into said container, said reservoir being on the inner end of said insert, said insert having one or more inlet passages therein and providing communication between the interior of the container and the hollow interior of said insert and said interior of said container discharge passage and positioned between said reservoir and said container discharge passage and admitting a sufficient quantity of material from the container to substantially fill the said hollow interior of said insert and the interior of said container discharge passage, and said reservoir having one or more discharge openings in the inner end of said insert and opening into said hollow interior of said insert and said interior of said container discharge passage interiorly of said inlet passages in said insert and substantially parallel to the axis of said discharge passage so that when paste-like material is extruded through the said space within the discharge passage and the insert, one or more streams of paste-like material are simultaneously discharged from the reservoir into the interior of the stream of material extruded through the hollow interior of the insert and the interior of the container discharge passage under the effect of the pressure transmitted through the orifices in the free end portion of the reservoir.

References Cited

UNITED STATES PATENTS

| | | | |
|---|---|---|---|
| 2,873,887 | 2/1959 | Spero | 222—94 |
| 2,914,220 | 11/1959 | Marraffino | 222—94 X |
| 3,042,263 | 7/1962 | Gallo | 222—94 |
| 3,217,931 | 11/1965 | Farrar et al. | 222—94 |

ROBERT B. REEVES, *Primary Examiner.*

N. L. STACK, *Assistant Examiner.*